(12) United States Patent
Uchibori

(10) Patent No.: US 10,511,737 B2
(45) Date of Patent: Dec. 17, 2019

(54) ELECTRONIC DEVICE, INFORMATION PROCESSING SYSTEM AND STORAGE MEDIUM

(71) Applicant: Hiroki Uchibori, Kanagawa (JP)

(72) Inventor: Hiroki Uchibori, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/977,182

(22) Filed: May 11, 2018

(65) Prior Publication Data

US 2018/0262637 A1    Sep. 13, 2018

Related U.S. Application Data

(63) Continuation of application No. 15/290,403, filed on Oct. 11, 2016, now Pat. No. 10,003,710, which is a continuation of application No. 14/611,340, filed on Feb. 2, 2015, now Pat. No. 9,491,326.

(51) Int. Cl.
*H04N 1/00* (2006.01)
*H04N 1/32* (2006.01)

(52) U.S. Cl.
CPC ....... *H04N 1/00973* (2013.01); *H04N 1/0097* (2013.01); *H04N 1/00204* (2013.01); *H04N 1/00344* (2013.01); *H04N 1/00938* (2013.01); *H04N 1/32523* (2013.01); *H04N 2201/0039* (2013.01); *H04N 2201/0074* (2013.01); *H04N 2201/0094* (2013.01); *H04N 2201/3204* (2013.01)

(58) Field of Classification Search
CPC .......... H04N 1/00973; H04N 1/00204; H04N 1/00344; H04N 1/00938; H04N 1/0097; H04N 1/32523; H04N 2201/0039; H04N 2201/0074; H04N 2201/0094; H04N 2201/3204
USPC ....................................... 358/1.13
See application file for complete search history.

(56) References Cited

U.S. PATENT DOCUMENTS

| | | | |
|---|---|---|---|
| 9,491,326 B2 | 11/2016 | Uchibori | |
| 2012/0127525 A1* | 5/2012 | Uchibori | G06F 3/1204 358/1.15 |
| 2012/0127527 A1 | 5/2012 | Nakabayashi et al. | |
| 2012/0239335 A1* | 9/2012 | Lachapelle | G05B 19/042 702/98 |
| 2013/0063761 A1* | 3/2013 | Uchibori | G06F 3/1285 358/1.14 |

(Continued)

FOREIGN PATENT DOCUMENTS

| | | |
|---|---|---|
| JP | 2008-250973 A | 10/2008 |
| JP | 2012-114567 A | 6/2012 |

*Primary Examiner* — Iriana Cruz
(74) *Attorney, Agent, or Firm* — Harness, Dickey & Pierce, P.L.C.

(57) ABSTRACT

An electronic device includes a setting unit configured to set setting information of an operation of the electronic device according to common setting information; a designation information acquisition unit configured to acquire designation information, which designates an acquisition origin of the common setting information, via a network; and a setting information acquisition unit configured to acquire the common setting information from the acquisition origin of the common setting information designated by the designation information acquired by the designation information acquisition unit.

9 Claims, 13 Drawing Sheets

(56) References Cited

U.S. PATENT DOCUMENTS

2013/0314732 A1* 11/2013 Nakabayashi ........ G06F 3/1204
　　　　　　　　　　　　　　　　　　　　　　358/1.13

* cited by examiner

| DESIGNATION ITEM | DESIGNATION CONTENT |
|---|---|
| FIRST PREFERENCE INFORMATION | | ~501
| ARRANGEMENT PLACE | http:// ~~ | ←503
| CLASS | SETTING INFORMATION FILE | ←504
| TYPE | FOR BACKUP/RESTORATION | ←505
| REFLECT/NOT REFLECT | REFLECT | ←506
| SECOND PREFERENCE INFORMATION | | ~502
| ARRANGEMENT PLACE | http:// ~~ |
| CLASS | IMAGE FILE |
| TYPE | -(UNDESIGNATED) |
| REFLECT/NOT REFLECT | REFLECT |
| THIRD PREFERENCE INFORMATION | |

| SETTING ITEM | SETTING VALUE | SETTING ITEM | SETTING VALUE |
|---|---|---|---|
| AUTOMATIC OFF TIME | 30 ms | COMPRESSION SETTING | GRAY SCALE |
| LOW POWER TRANSITION TIME | 30 ms | TRANSMISSION MAIL SIZE RESTRICTION | YES |
| PREHEATING TRANSITION TIME | 30 ms | DIVISION UPON EXCEEDING MAIL SIZE RESTRICTION | NO |
| SYSTEM AUTOMATIC RESET TIME | 30 ms | COMPRESSION LEVEL OF HIGH COMPRESSION PDF | 2 |
| AUTOMATIC LOGOUT TIME | 30 ms | PREFERRED IMAGE QUALITY UPON SELECTING AUTOMATIC COLOR | NORMAL |
| VALID PROTOCOL | HTTP, FTP | AUTOMATIC DENSITY SETTING | DARK |
| TRANSFER RATE | 100 Mbps | NUMBER OF CALLS | 10 |
| INTERFACE SELECTION | Ethernet | RECEIVED PRINT COLOR | BLACK |
| DNS SETTING | | PRINT COLOR UPON TONER RUNNING OUT | MAGENTA |
| USER AUTHENTICATION | YES | OUTPUT PAPER FEED TRAY SELECTION | TRAY 1 |
| ADMINISTRATOR AUTHENTICATION | YES | DESTINATION USE RESTRICTION | YES |
| PREHEAT LEVEL | 2 | DESTINATION REGISTRATION RESTRICTION | YES |
| LOW POWER LEVEL | 3 | PERSONAL DATA DISPLAY RESTRICTION | NO |
| LOG TRANSFER | YES | ENHANCEMENT OF PROTECTION FOR DOCUMENT | YES |
| COLOR/MONOCHROME | COLOR | SETTING BY SNMPV1, V2 | PREVENTED |
| AUTOMATIC RESET TIME | 30 ms | FORWARDING TO DESTINATION DESIGNATED FOR RECEIVING FACSIMILE | NOT PREVENTED |
| USER RESTRICTION | NO | FACSIMILE REMOTE DIAGNOSIS | NOT PREVENTED |
| SINGLE-SIDED/ DOUBLE-SIDED | DOUBLE-SIDED | FIRMWARE UPDATE | PREVENTED |
| COLLECTIVE PRINTING | 2-UP | CONFIGURATION CHANGE OF FIRMWARE | PREVENTED |
| SORTING | NO | DRIVER ENCRYPTION KEY | aaaaa |

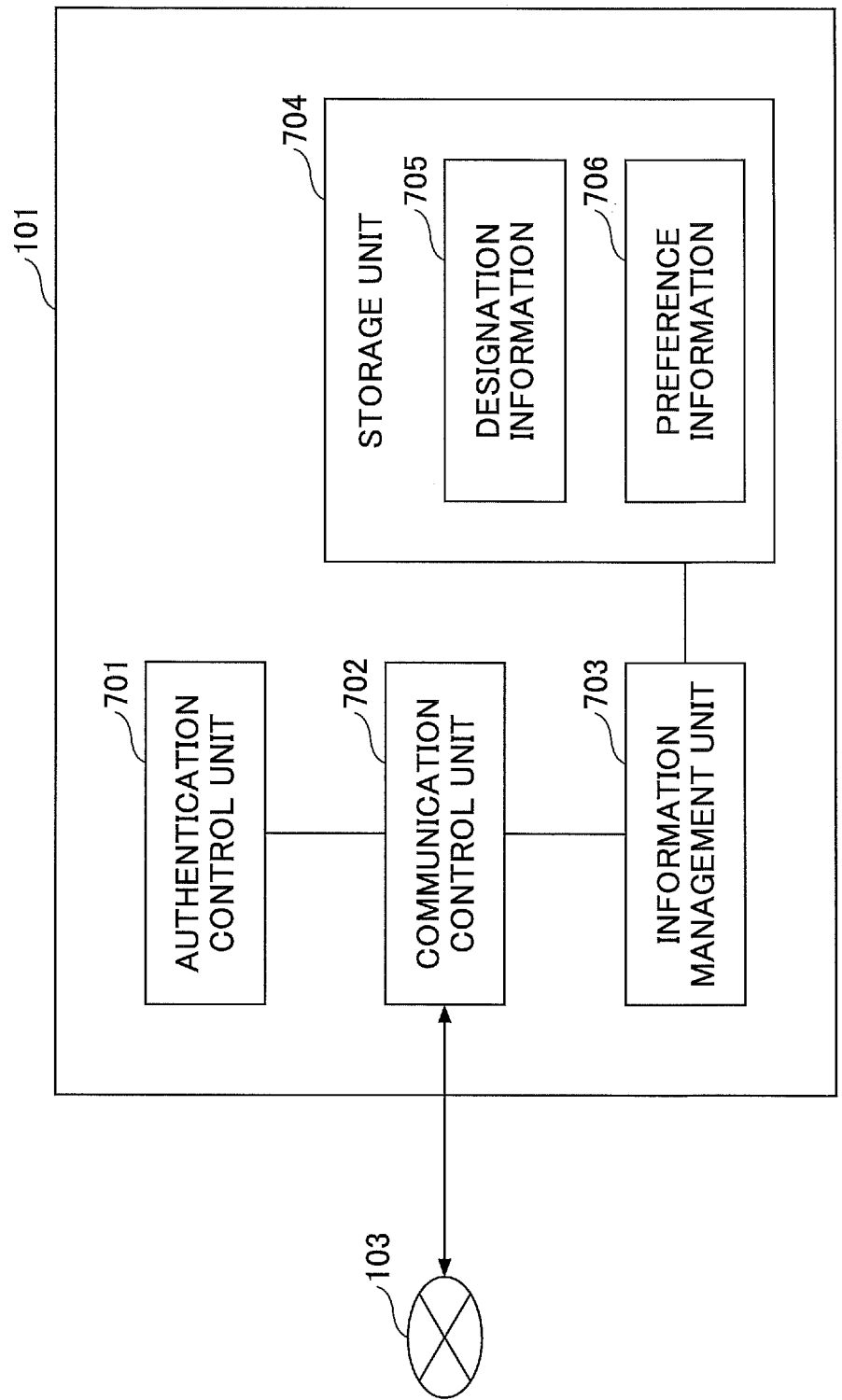

ELECTRONIC DEVICE, INFORMATION PROCESSING SYSTEM AND STORAGE MEDIUM

BACKGROUND OF THE INVENTION

1. Field of the Invention

The disclosures herein generally relate to an electronic device, an information processing system and a storage medium.

2. Description of the Related Art

Recently, as image forming apparatuses are made multifunctional, numbers of settings for operating respective functions are increased. Thus, device setting upon newly introducing an image forming apparatus or updating an application program becomes complicated, and burdens on administrators are increased.

For the above problem, for example, Japanese Published Patent Application No. 2012-114567 discloses an image forming apparatus that acquires common setting information common to plural image forming apparatuses from an information processing apparatus which has been designated in advance, and sets setting information based on the acquired common setting information.

In the case of performing a collective setting for setting information for devices, a setting method of transmitting the setting information to the devices and performing setting for the devices by using, for example, a management tool using WebService/MIB or the like is called a push type setting method. On the other hand, as disclosed in Japanese Published Patent Application No. 2012-114567, a setting method of acquiring (pulling out) device setting information file (preference information) from an external server or the like in response to a request from the image forming apparatus is called a pull type setting method.

SUMMARY OF THE INVENTION

It is a general object of at least one embodiment of the present invention to provide an electronic device an information processing system and a storage medium that substantially obviate one or more problems caused by the limitations and disadvantages of the related art.

In one embodiment, an electronic device includes a setting unit configured to set setting information of an operation of the electronic device according to common setting information; a designation information acquisition unit configured to acquire designation information, which designates an acquisition origin of the common setting information, via a network; and a setting information acquisition unit configured to acquire the common setting information from the acquisition origin of the common setting information designated by the designation information acquired by the designation information acquisition unit.

In another embodiment, an information processing system includes a setting unit configured to set setting information of an operation of at least one of a plurality of electronic devices according to common setting information; a first storage unit configured to store designation information, which designates an acquisition origin of the common setting information to be applied to the plurality of electronic devices; a second storage unit configured to store the common setting information; a designation information acquisition unit configured to acquire the designation information from the first storage unit; and a setting information acquisition unit configured to acquire the common setting information from the second storage unit designated by the designation information acquired by the designation information acquisition unit.

In yet another embodiment, a non-transitory computer-readable storage medium stores a program for causing an electronic device to execute a process of setting setting information of an operation of the electronic device. The process includes a designation information acquisition step of acquiring designation information, which designates an acquisition origin of common setting information, via a network; a setting information acquisition step of acquiring the common setting information from the acquisition origin of the common setting information designated by the designation information acquired at the designation information acquisition step; and a setting step of setting the setting information according to the common setting information acquired at the setting information acquisition step.

According to the embodiments of the present invention, an electronic device that easily provides an acquisition origin of common setting information for plural electronic devices in the information processing system that sets the common setting information for the plural electronic devices by using the pull type setting method, is provided.

BRIEF DESCRIPTION OF THE DRAWINGS

Other objects and further features of embodiments will be apparent from the following detailed description when read in conjunction with the accompanying drawings, in which:

FIG. 5 is a diagram illustrating an example of designation information according to the present embodiment;

FIG. 6 is a diagram illustrating an example of preference information according to the present embodiment;

FIG. 7 is a functional configuration diagram illustrating an example of a server apparatus according to the first embodiment;

DESCRIPTION OF THE PREFERRED EMBODIMENTS

In the following, embodiments of the present invention will be described with reference to the accompanying drawings.

<System Configuration>

Figure 1:
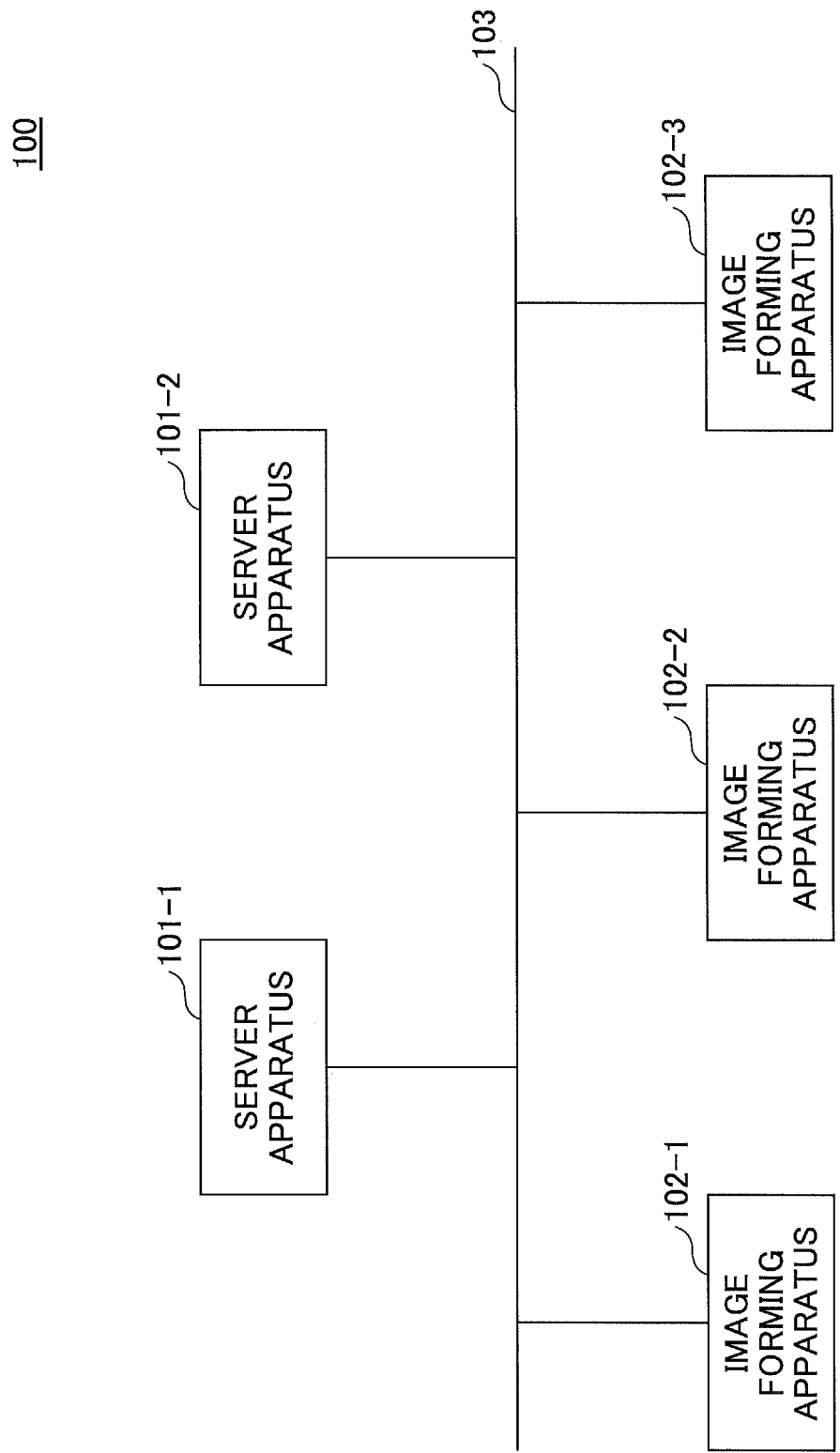
FIG. 1 is a diagram illustrating an example of a hardware configuration of an information processing system according to a present embodiment.

FIG. 1 is a diagram illustrating an example of a configuration of an information processing system according to a present embodiment. The information processing system 100 includes plural server apparatuses 101-1, 101-2 and plural image forming apparatuses 102-1, 102-2 and 102-3 which are connected to a network 103 such as the Internet or a LAN (Local Area Network), for example. Meanwhile, in the following explanation, in order to indicate an arbitrary server apparatus of the plural server apparatuses 101-1, 101-2, terms "server apparatus 101" are used. Similarly, in order to indicate an arbitrary image forming apparatus of the plural image forming apparatuses, terms "image forming apparatus 102" are used.

The server apparatus 101 retains preference information (common setting information) to be applied to the plural image forming apparatuses 101-1 to 101-3 and/or designation information indicating an acquisition origin, a class or the like of the preference information. Meanwhile, the server apparatus 101 is an example of an information processing apparatus that stores the preference information and/or the designation information.

The image forming apparatus 102 is, for example, a multifunction peripheral provided with a function of a printer, a copier, a scanner, a facsimile or the like. The image forming apparatus 102 acquires the designation information from a predetermined server apparatus, e.g. the server apparatus 101-1 or the like, and acquires preference information from the acquisition origin which is designated by the acquired designation information, e.g. the server apparatus 101-2 or the like. Moreover, the image forming apparatus 102 sets setting information which is stored in a storage unit based on the acquired preference information, and operates according to the setting information.

Meanwhile, the image forming apparatus 102 is an example of an electronic device that operates according to the setting information stored in the storage unit. For example, the electronic device may be an image forming apparatus such as a printer, a copier, a scanner, a facsimile machine or the like, or may be a device that does not form an image, such as a lighting device, a card reader, a security device or the like.

According to the above-described configuration, the information processing system 100 provides a pull type setting method for preference information for the plural image forming apparatuses 102-1 to 102-3 or the like, for example. Furthermore, in the information processing system 100, for example, the acquisition origin of the preference information can be easily designated (changed) according to the designation information stored in the server apparatus 101-1 or the like. Thus, in the information processing system 100 that sets common setting information for plural electronic devices (image forming apparatus 102-1 to 102-3 or the like) by using the pull type setting method, an acquisition origin of the common setting information can be instructed easily to the plural electronic devices.

<Hardware Configuration>

(Image Forming Apparatus)

Figure 2:
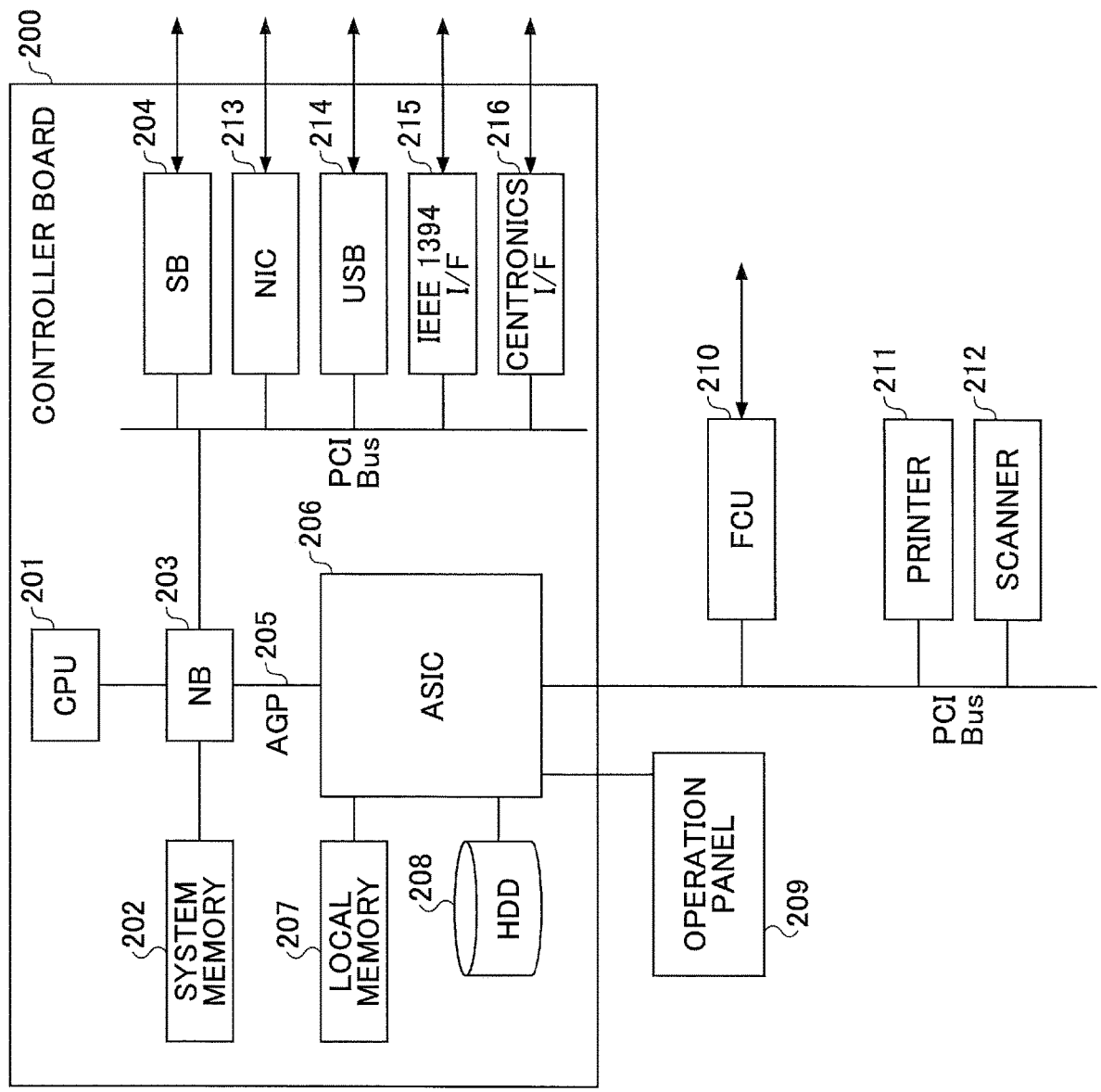
FIG. 2 is a diagram illustrating an example of a hardware configuration of an image forming apparatus according to the present embodiment.

FIG. 2 is a diagram illustrating an example of a hardware configuration of the image forming apparatus according to the present embodiment. The image forming apparatus 102 includes, for example, a controller board 200, an operation panel 209, an FCU (Facsimile Control Unit) 210, and a hardware engine such as a printer 211, a scanner 212 or the like.

The controller board 200 includes a configuration of a general computer. That is, the controller board 200 includes a CPU (Central Processing Unit) 201, a system memory 202, an NB (North Bridge) 203, an SB (South Bridge) 204, an ASIC (Application Specific Integrated Circuit) 206, a local memory 207, an HDD (Hard Disk Drive) 208, a NIC (Network Interface Card) 213, a USB interface 214, an IEEE 1394 interface 215, a Centronics interface 216 and the like.

The operation panel 209 is connected to the ASIC 206 in the controller board 200. Moreover, the SB 204, the NIC 213, the USB interface 214, the IEEE 1394 interface 215 and the Centronics interface 216 are connected to the NB 203 via a PCI bus. Moreover, the FCU 210, the printer 211 and the scanner 212 are connected to the ASIC 206 in the controller board 200 via the PCI bus.

Meanwhile, in the controller board 200, the local memory 207, the HDD 208 and the like are connected to the ASIC 206, and the CPU 201 and the ASIC 206 are connected via the NB 203 of the CPU chip set. Moreover, the ASIC 206 and the NB 203 are not connected via the PCI bus but are connected to each other via an AGP (Accelerated Graphics Port) 205 for speeding up.

The CPU 201 performs overall control of the image forming apparatus 102. The CPU 201 executes, for example, a program of an operating system, an application, respective services or the like stored in the HDD 208 or the like, and thereby realizes the respective functions of the image forming apparatus 102.

The NB 203 connects the CPU 201, the system memory 202, the SB 204 and the ASIC 206. The system memory 202 is used as a memory for plotting or the like of the image forming apparatus 102. The SB 204 connects the NB 203, the PCI bus and a peripheral device. Moreover, the local memory 207 is used as an image buffer for copying or a code buffer. The system memory 202 or the local memory 207 will be simply denoted a memory or a storage area.

The ASIC 206 is used for image processing including hardware elements for image processing. The HDD 208 is a storage device for storing, for example, an image, programs, font data, a form or the like.

Moreover, the operation panel 209 is hardware (operation unit) for receiving an input operation by a user, and is also hardware (display unit) for performing display for the user. The FCU 210 transmits/receives facsimile data according to, for example, a standard such as G3 FAX (Group 3 Facsimile) or the like. The printer 211 performs printing in response to, for example, control of a program or the like which is executed by the CPU 201. The scanner 212 performs readout processing in response to, for example, control of a program or the like which is executed by the CPU 201.

The NIC 213 is a communication interface, which connects the image forming apparatus 102 to the network 103, and transmits/receives data. The USB interface 214 is a serial bus interface for connecting, for example, a recording medium such as a USB memory or various USB devices. The IEEE 1394 interface 215 connects a device compliant with the IEEE 1394 which is a high speed serial bus standard. The Centronics interface 216 connects a device compliant with the Centronics specification which is a specification of parallel port.

(Server Apparatus)

The server apparatus 101 includes is provided with a configuration of a general computer.

Figure 3:
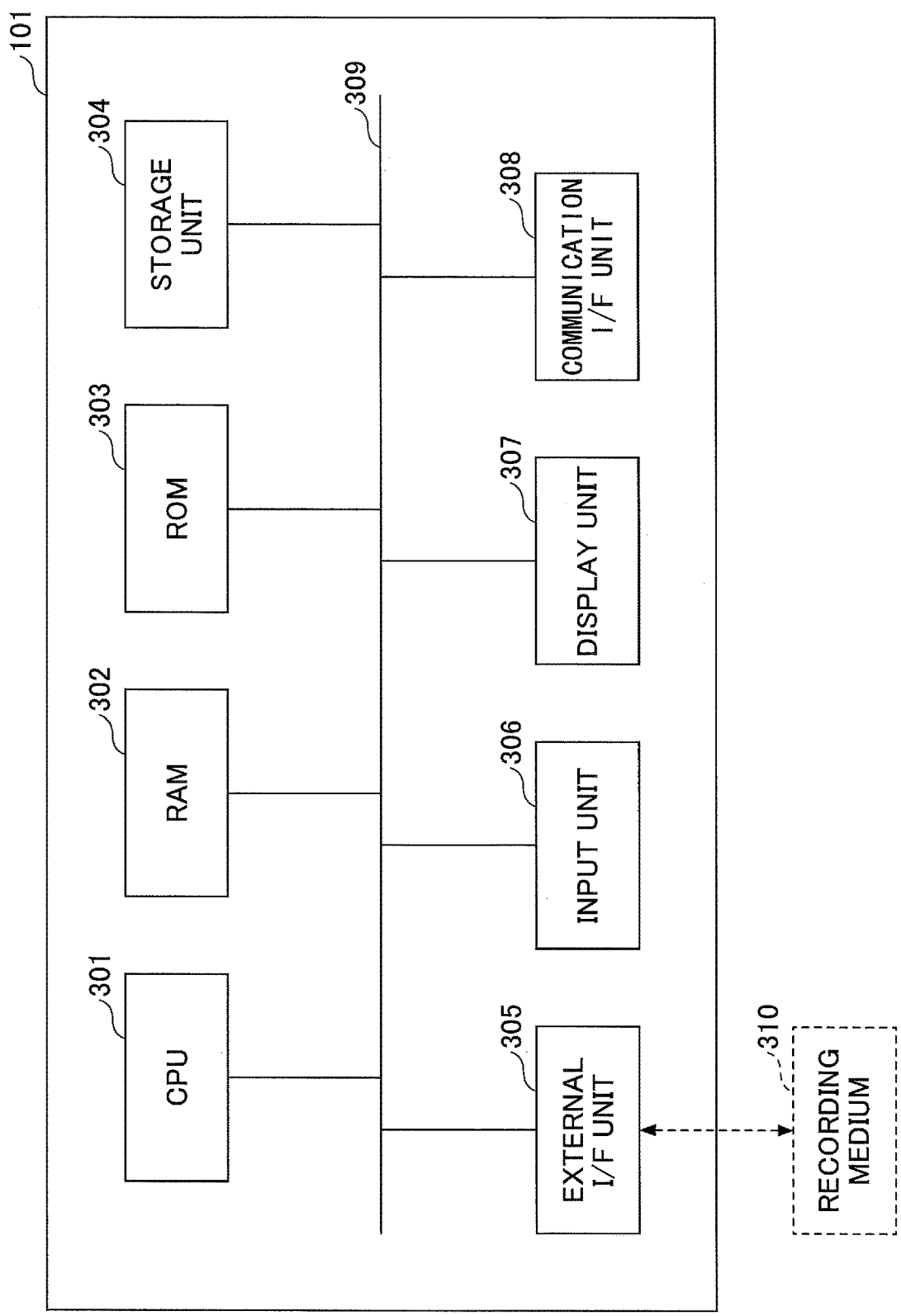
FIG. 3 is a diagram illustrating an example of a hardware configuration of a computer according to the present embodiment.

FIG. 3 is a diagram illustrating an example of a hardware configuration of the server apparatus 101 according to the present embodiment. The server apparatus 101 includes, for example, a CPU (Central Processing Unit) 301, a RAM (Random Access Memory) 302, a ROM (Read Only Memory) 303, a storage unit 304, an external I/F (interface) unit 305, an input unit 306, a display unit 307, a communication I/F unit 308, a bus 309 or the like.

The CPU 301 reads out a program or data stored in the ROM 303, the storage unit 304 or the like onto the RAM 302, and executes processing, thereby realizes the respective functions of the server apparatus 101. The RAM 302 is a volatile memory used as a work area for the CPU 301 or the like. The ROM 303 is a non-volatile memory that can retain a program or data even when the electric power is OFF. For example, the ROM 303 is configured with flash ROMs or the like.

The storage unit 304 includes, for example, an HDD (Hard Disk Drive), an SSD (Solid State Drive), or the like. The storage unit 304 stores an OS (operating system), an application program, respective data or the like.

The external I/F 305 is an interface to an external device. The external device includes, for example, a recording medium 310 or the like. The server apparatus 101 can perform readout processing from and/or write processing to the recording medium 310 via the external I/F 305. The recording medium 310 includes, for example, an optical disk, a magnetic disk, a memory card, a USB (Universal Serial Bus) memory or the like.

Moreover, a predetermined program is stored in the recording medium 310, and the program stored in the recording medium is installed in the server apparatus 101 via the external I/F 305, and thereby the predetermined program becomes executable.

The input unit 306 includes a pointing device such as a mouse, a keyboard or the like. The input unit 306 is used for inputting respective operation signals to the server apparatus 101. The display unit 307 includes a display or the like, and displays a result of processing by the server apparatus 101 or the like.

The communication I/F 308 connects the server apparatus 101 to the network 103. Thus, the server apparatus 101 can perform data communication with the other devices via the communication I/F 308 and the network 103. The bus 309 is connected to the respective components, and transmits an address signal, a data signal, various control signals and the like.

Meanwhile, the configuration of FIG. 3 is only an example. The server apparatus 101 may include, for example, the input unit 306, the display unit 307 or the like outside the server apparatus 101.

Furthermore, the server apparatus 101 may not include the input unit 306 or the display unit 307.

<Functional Configuration>

Figure 4:
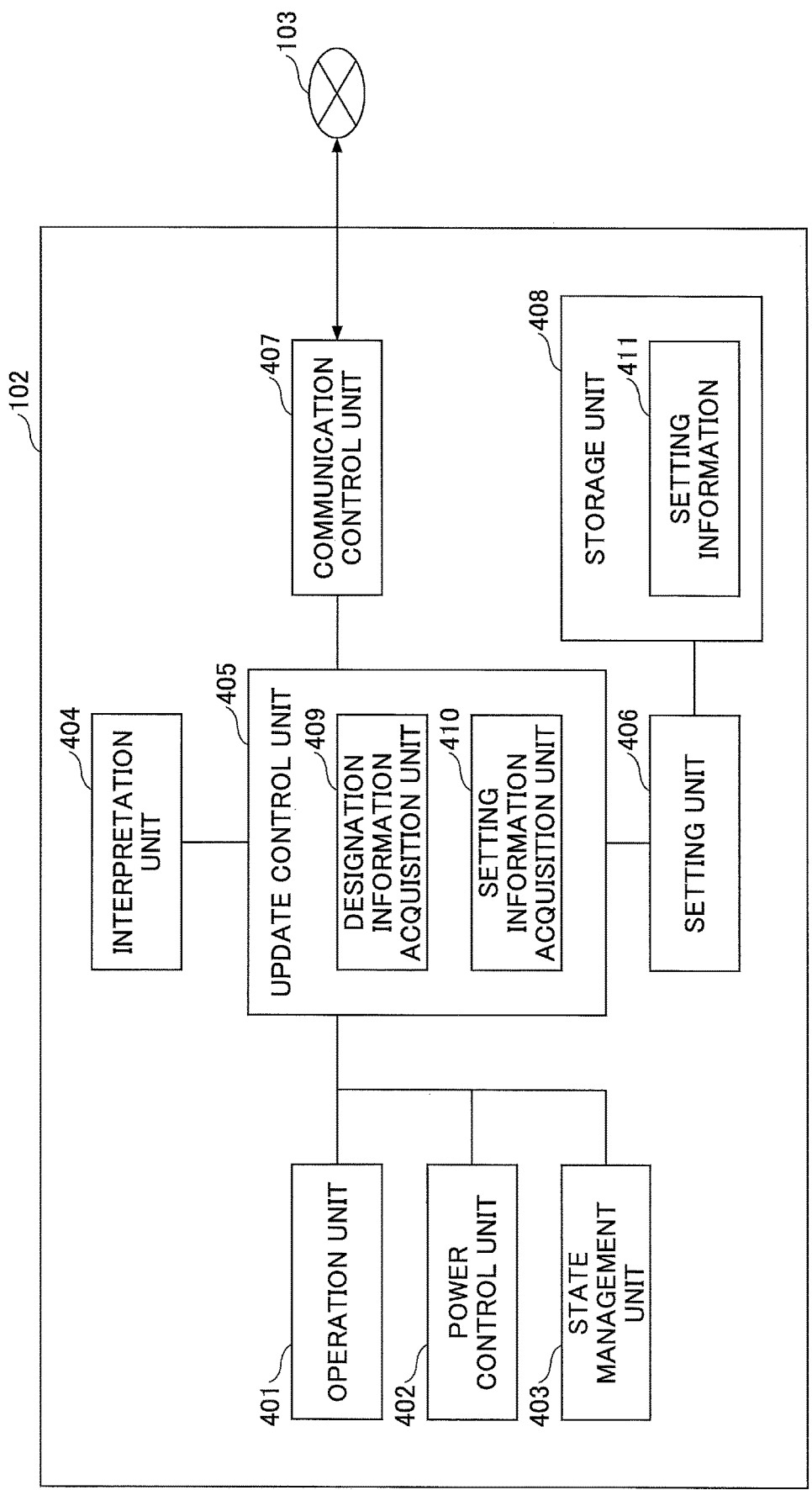
FIG. 4 is a functional configuration diagram illustrating an example of the image forming apparatus according to the present embodiment.

FIG. 4 illustrates an example of a functional configuration diagram of the image forming apparatus 102 according to the present embodiment. The image forming apparatus 102 includes an operation unit 401, a power control unit 402, a state management unit 403, an interpretation unit 404, an update control unit 405, a setting unit 406, a communication control unit 407, a storage unit 408 and the like.

The operation unit 401 displays various pieces of information and receives an input operation by a user. The operation unit 401 is realized by, for example, the operation panel 209 in FIG. 2, a control program thereof and the like.

The power control unit 402 controls power-on and power-off of the image forming apparatus 102 or the like. The state management unit 403 manages a state of the image forming apparatus 102, and gives notice of a failure state or the like to the other unit.

The update control unit 405 controls, for example, an update of preference information and a setting thereof according to a predetermined condition. The predetermined condition includes, for example, a timing when the operation unit 401 receives a predetermined operation, a timing when a notice of power on is received from the power control unit 402, a timing when the notice of the failure state is received from the state management unit 403 or the like.

Moreover, the update control unit 405 includes, for example, a designation information acquisition unit 409, a setting information acquisition unit 410 and the like. The designation information acquisition unit 409 acquires designation information including information indicating an acquisition origin of preference information from a predetermined server apparatus (information processing apparatus) 101 connected via the network 103. The setting information acquisition unit 410 acquires the preference information from the acquisition origin based on the information indicating the acquisition origin of the preference information included in the designation information acquired by the designation information acquisition unit 409.

The interpretation unit 404 interprets of the designation information acquired by the designation information acquisition unit 409. For example, the interpretation unit 404 extracts the acquisition origin of the preference information, gives notice of the acquisition origin of the preference information to the setting information acquisition unit 410, and gives notice of a class of the preference information to the setting unit 406. Meanwhile, the configuration of FIG. 4 is only an example. For example, the update control unit 405 may be provided with the function of the interpretation unit 404.

The setting unit 406 sets setting information 411 to be stored by the storage unit 408 based on the preference information acquired by the setting information acquisition unit 410, the class of preference information reported by the interpretation unit 404 or the like.

The communication control unit 407 controls the communication with the server apparatus 101 connected via the network 103 or the like.

Meanwhile, the power control unit 402, the state management unit 403, the interpretation unit 404, the update control unit 405, the designation information acquisition unit 409, the setting information acquisition unit 410, the setting unit 406, the communication control unit 407 or the like is realized by a program executed by the CPU 201 in FIG. 2 or the like.

The storage unit 408 stores the setting information 411 of the image forming apparatus 102. For example, the storage unit 408 is realized by the HDD 208 in FIG. 2 or the like.

According to the above-described configuration, the image forming apparatus 102 acquires the designation information from the predetermined server apparatus 101, acquires the preference information from the acquisition origin indicated by the designation information and stores the acquired preference information as the setting information 411.

<Designation Information>

FIG. 5 is a diagram illustrating an example of designation information according to the present embodiment. In FIG. 5, the designation information 500 includes plural pieces of preference information 501, 502. Each piece of preference information includes information of an arrangement place 503, a category 504, a type 505, a distinction between reflecting and not reflecting 506 and the like.

The arrangement place 503 is address information indicating an acquisition origin of the preference information, such as a URL (Uniform Resource Locator), for example.

Conventionally, there is a problem that an arrangement place of preference information needs to be set in a device in advance and the preference information can be acquired only from the designated arrangement place. On the other hand, in the present embodiment, an acquisition origin of the preference information is indicated in the designation information 500. Furthermore, in the present embodiment, since the designation information may include plural arrangement places 503 of preference information, even if the preference information is arranged in plural server apparatuses, for example, setting information can be acquired easily by using the pull type setting method.

The category 504 indicates a category of the preference information such as a setting information file or an image file, for example. The type 505 indicates a type of the preference information for each category. For example, in the case where the preference information is a setting information file, the type 505 indicates whether the file is for backup/restoration or for changing setting. The category 504 and the type 505 are examples of information indicating a class of the preference information.

Meanwhile, the preference information includes plural categories, such as a setting information file for backup/restoration, content of which cannot be changed, a setting information file for changing setting, content of which can be arbitrarily changed, or an image file, which is displayed on the device as a logo or an icon. Moreover, depending on the category of the preference information, each setting method is different. However, there has been a problem that in the conventional pull-type setting method for the preference information, since the category of the preference information cannot be determined, only the preference information of the preliminarily specified category can be set.

On the other hand, in the present embodiment, information indicating a class of the preference information such as the category 504 or the type 505 is provided for each piece of preference information by the designation information 500, and plural pieces of preference information, categories of which are different from each other, can be set collectively by using the pull-type method.

The distinction between reflecting and not reflecting 506 indicates whether to reflect the preference information to the setting information 411. By setting not to reflect as necessary preference information, which is reflected depending on a time zone or a day of week, preference information, which is not changed or the like, for example, unnecessary update process of setting information can be avoided.

<Preference Information>

FIG. 6 is a diagram illustrating an example of the preference information according to the present embodiment. The preference information 600 includes plural setting items 601 and setting values 602 thereof. By the plural image forming apparatuses 102-1 to 102-3 acquiring the preference information 600, respectively, and storing (memorize) it into the setting information 411, a common setting can be easily reflected to the plural image forming apparatuses 102-1 to 102-3. The image forming apparatus 102 operates based on the setting information 411 to which the preference information 600 is reflected.

Meanwhile, the preference information 600 may include information indicating acquisition origin of the designation information. Thus, it becomes possible to change the acquisition origin of the designation information by using the preference information 600.

[First Embodiment]

In the first embodiment, a basic system configuration will be explained.

FIG. 7 is a functional configuration diagram of a server apparatus 101 according to the first embodiment. The server apparatus 101 includes an authentication control unit 701, a communication control unit 702, an information management unit 703, a storage unit 704 and the like.

The authentication control unit 701 requires authentication to access the server apparatus 101. For example, the authentication control unit 701 performs an authentication of an electronic device such as the image forming apparatus 102. The authentication control unit 701 performs the authentication using, for example, identification information of the electronic device, identification information of a user, a password thereof, and the like, and permits an access of the electronic device of which the authentication has been successful.

The communication control unit 702 controls communication with an electronic device connected via the network 103, such as the image forming apparatus 102 or the like, for example.

The information management unit 703 manages information such as the designation information 705 stored in the storage unit 704, the preference information 706 or the like. The information management unit 703 performs, for example, in response to a request from the electronic device such as image forming apparatus 102 or the like, readout of the designation information 705 and/or the preference information 706, and sends it to the electronic device, which is a request source, via the communication control unit 702.

Meanwhile, the authentication control unit 701, the communication control unit 702 and the information management unit 703 are realized by, for example, a program operating in the CPU 301 in FIG. 3 or the like.

The storage unit 704 is realized by, for example, the storage unit 304 in FIG. 3 or the like, and stores the designation information 705 and the preference information 706 in advance.

<Flow of Processing>

Figure 8:
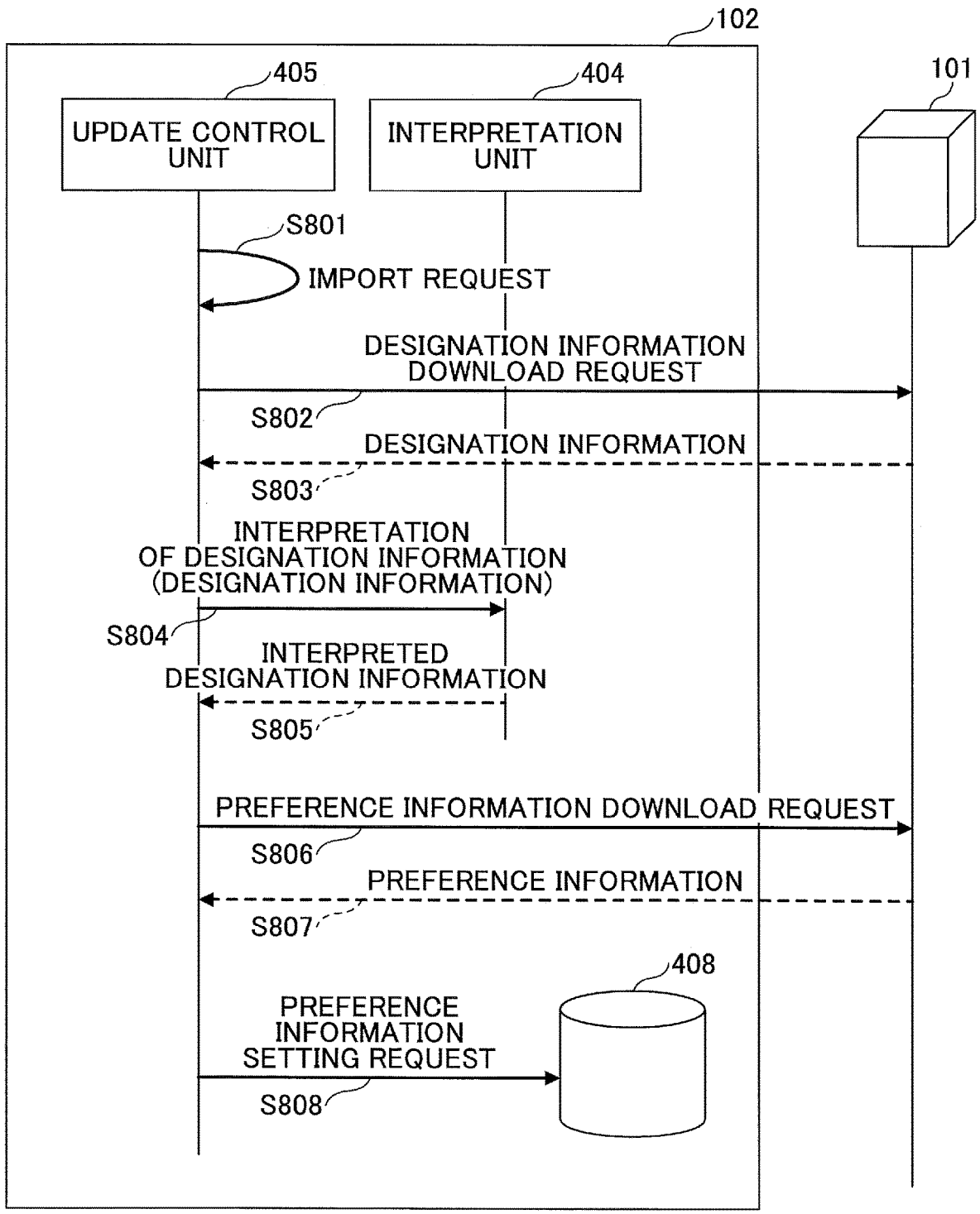
FIG. 8 is a sequence chart illustrating an example of processing for setting preference information according to the first embodiment.

FIG. 8 is a sequence chart illustrating processing of setting preference information according to the first embodiment.

The update control unit 405 detects an import request based on a predetermined condition, e.g. an operation for the operation unit 401 or the like (step S801).

At step S802, in the case where it is determined that there is an import request, the designation information acquisition unit 409 of the update control unit 405 sends a designation information download request to a predetermined server apparatus 101 via the communication control unit 407. Meanwhile, the image forming apparatus 102 stores information (e.g. URL information or the like) of the predetermined server apparatus 101, to which the designation information download request is sent, in the setting information 411 or the like in advance, for example.

At step S803, the server apparatus 101, upon receiving the designation information download request from the image forming apparatus 102, reads out the designation information 705 stored in the storage unit 704 and sends it to the image forming apparatus 102 which is the request source.

At step S804, the update control unit 405 requires the interpretation unit 404 to interpret the designation information received from the server apparatus 101.

At step S805, the interpretation unit 404 performs the required interpretation of the designation information, and sends the interpreted designation information to the update control unit 405. Meanwhile, in the present embodiment, an arrangement place (acquisition origin) of the preference information included in the designation information is assumed to be the server apparatus 101.

At step S806, the setting information acquisition unit 410 of the update control unit 405 sends a preference information download request to the server apparatus 101, which is the acquisition origin of the preference information, included in the interpreted designation information.

At step S807, the server apparatus 101, upon receiving the preference information download request from the image forming apparatus 102, reads out the preference information 706 stored in the storage unit 704 and sends it to the image forming apparatus 102, which is the request source.

At step S808, the update control unit 405 requires the setting unit 406 to set the preference information received from the server apparatus 101. The setting unit 406, which receives the request, reflects the preference information to the setting information 411 stored in the storage unit 408.

In this way, since the image forming apparatus 102 acquires preference information from an acquisition origin instructed by the designation information, it is not necessary to change settings of plural image forming apparatuses 102, respectively, in the case of changing the acquisition origin of the preference information. A user would only have to change the designation information 705 stored in the storage unit 704 of the server apparatus 101 in the case of changing the acquisition origin of the preference information. Meanwhile, it is assumed that the designation information 705 can be changed from the image forming apparatus 102, the serve apparatus 101, an arbitrary information processing apparatus or the like.

In this way, according to the first embodiment, in setting device information by using the pull-type method, an acquisition origin of preference information can be easily instructed (changed). Moreover, as described in the following embodiments, various applications are possible.

[Second Embodiment]

In a second embodiment, a system configuration using plural server apparatuses 101-1, 102-2 will be explained.

Figure 9:
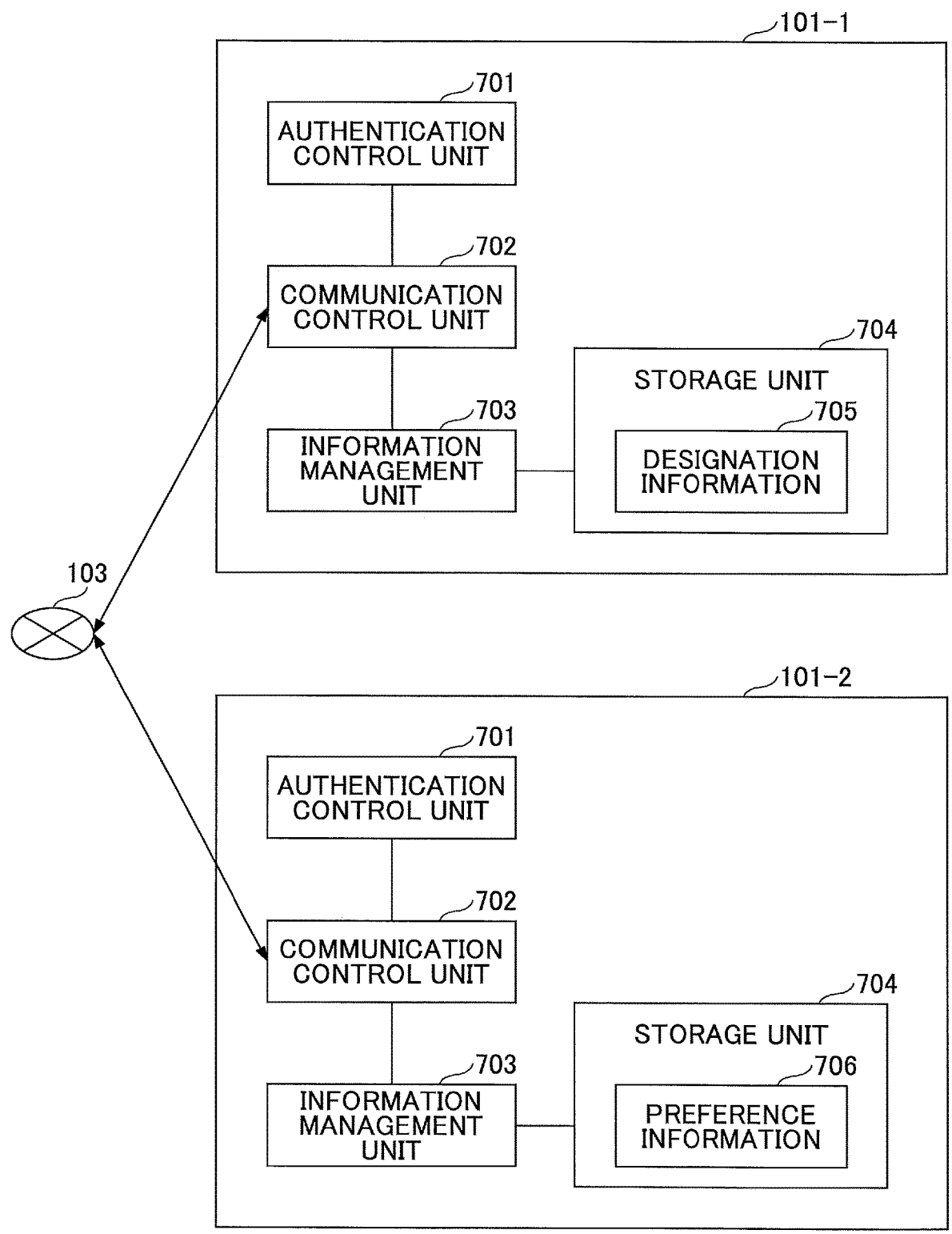
FIG. 9 is a functional configuration diagram illustrating an example of a server apparatus according to the second embodiment.

FIG. 9 is a functional configuration diagram illustrating an example of the server apparatuses according to the second embodiment. The server apparatus 101-1 includes, the same as the server apparatus 101 in the first embodiment, an authentication control unit 701, a communication control unit 702, an information management unit 703 and a storage unit 704. Moreover, the storage unit 704 stores designation information 705.

The server apparatus 101-2 includes, the same as the server apparatus 101 in the first embodiment, an authentication control unit 701, a communication control unit 702, an information management unit 703 and a storage unit 704. Moreover, the storage unit 704 stores preference information 706.

<Flow of Processing>

Figure 10:
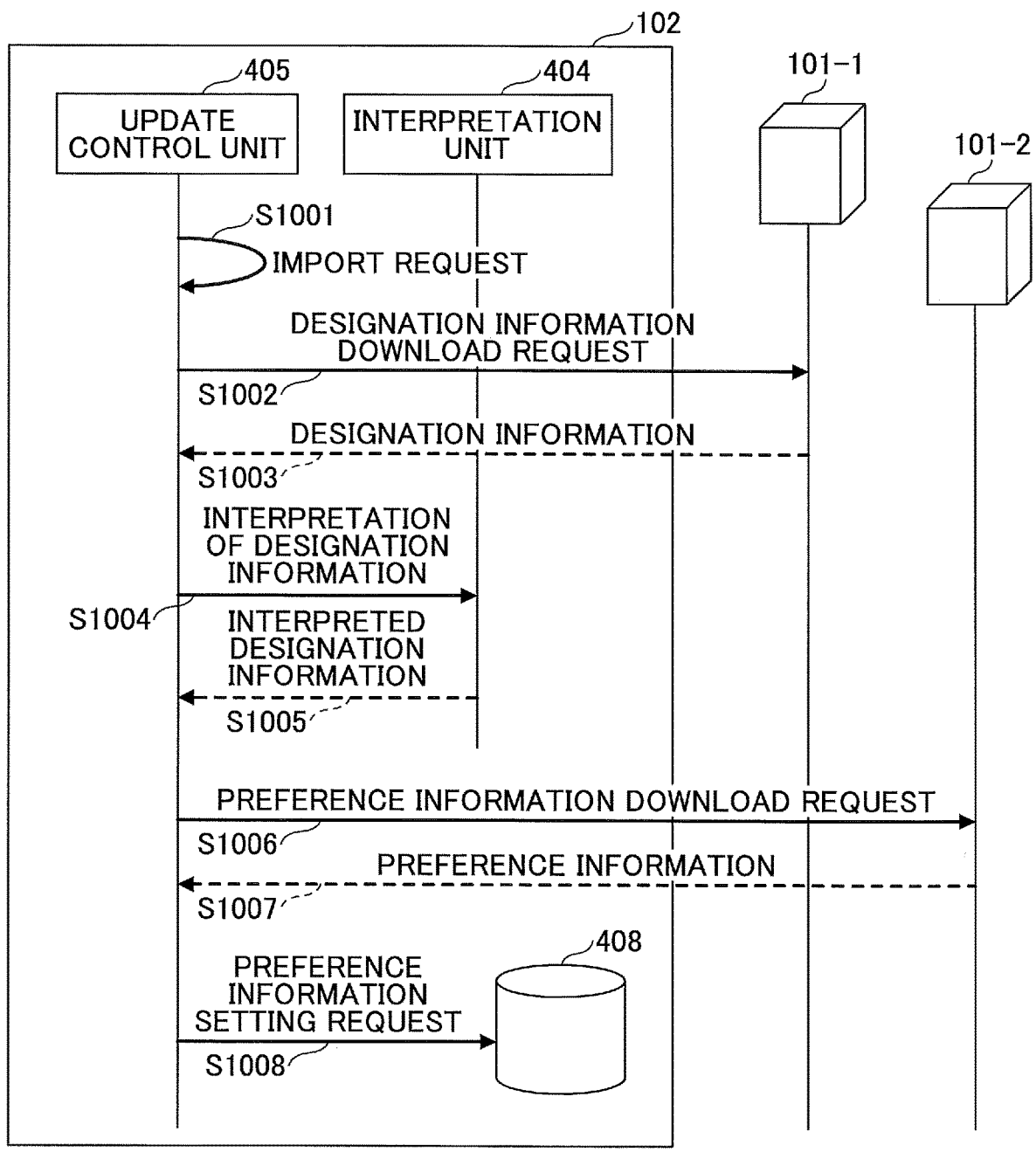
FIG. 10 is a sequence chart illustrating an example of processing for setting preference information according to the second embodiment.

FIG. 10 is a sequence chart illustrating an example of setting the preference information according to the second embodiment.

At step S1001, the update control unit 405 detects an import request based on the predetermined condition, e.g. an operation to the operation unit 401 or the like.

At step S1002, in the case where it is determined that there is an import request, the designation information acquisition unit 409 of the update control unit 405 sends a designation information download request to a predetermined server apparatus 101-1 via the communication control unit 407. Meanwhile, the image forming apparatus 102 stores information (e.g. URL information or the like) of the predetermined server apparatus 101-1, to which the designation information download request is sent, in the setting information 411 or the like in advance, for example.

At step S1003, the server apparatus 101-1, upon receiving the designation information download request from the image forming apparatus 102, reads out the designation information 705 stored in the storage unit 704 and sends it to the image forming apparatus 102 which is the request source.

At step S1004, the update control unit 405 requires the interpretation unit 404 to interpret the designation information received from the server apparatus 101-1.

At step S1005, the interpretation unit 404 performs the required interpretation of the designation information, and sends the interpreted designation information to the update control unit 405. Meanwhile, in the present embodiment, an arrangement place (acquisition origin) of the preference information included in the designation information is assumed to be the server apparatus 101-2.

At step S1006, the setting information acquisition unit 410 of the update control unit 405 sends a preference information download request to the server apparatus 101-2, which is the acquisition origin of the preference information, included in the interpreted designation information.

At step S1007, the server apparatus 101-2, upon receiving the preference information download request from the image forming apparatus 102, reads out the preference information 706 stored in the storage unit 704 and sends it to the image forming apparatus 102, which is the request source.

At step S1008, the update control unit 405 requires the setting unit 406 to set the preference information received from the server apparatus 101-2. The setting unit 406, which receives the request, reflects the preference information to the setting information 411 stored in the storage unit 408.

In this way, according to the second embodiment, an operation, in which the server apparatus 101-1 storing the designation information 705 and the server apparatus 101-2 storing the preference information 706 are separated from each other, is possible.

[Third Embodiment]

In a third embodiment, a case of setting plural pieces of preference information will be explained.

Figure 11:
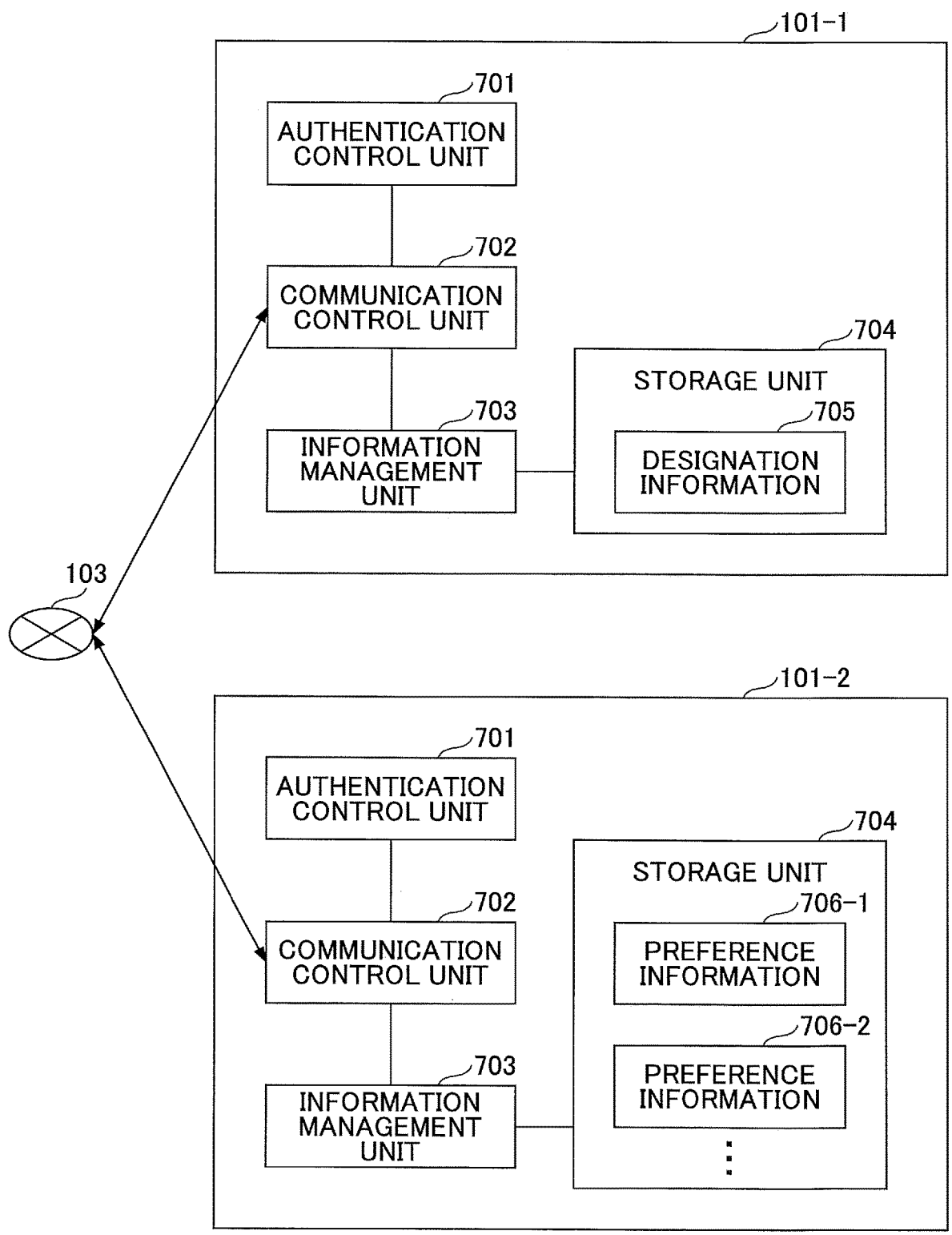
FIG. 11 is a functional configuration diagram illustrating an example of a server apparatus according to the third embodiment.

FIG. 11 is a functional configuration diagram illustrating an example of a server apparatus according to the third embodiment. A server apparatus 101-1 includes, as the server apparatus 101 according to the first embodiment, an authentication control unit 701, a communication control unit 702, an information management unit 703 and a storage unit 704. Moreover, the storage unit 704 stores designation information 705.

A server apparatus 101-2 includes, as the server apparatus 101 according to the first embodiment, an authentication control unit 701, a communication control unit 702, an information management unit 703 and a storage unit 704. Moreover, the storage unit 704 stores plural pieces of preference information 706-1, 702-2 and the like.

<Flow of Processing>

Figure 12:
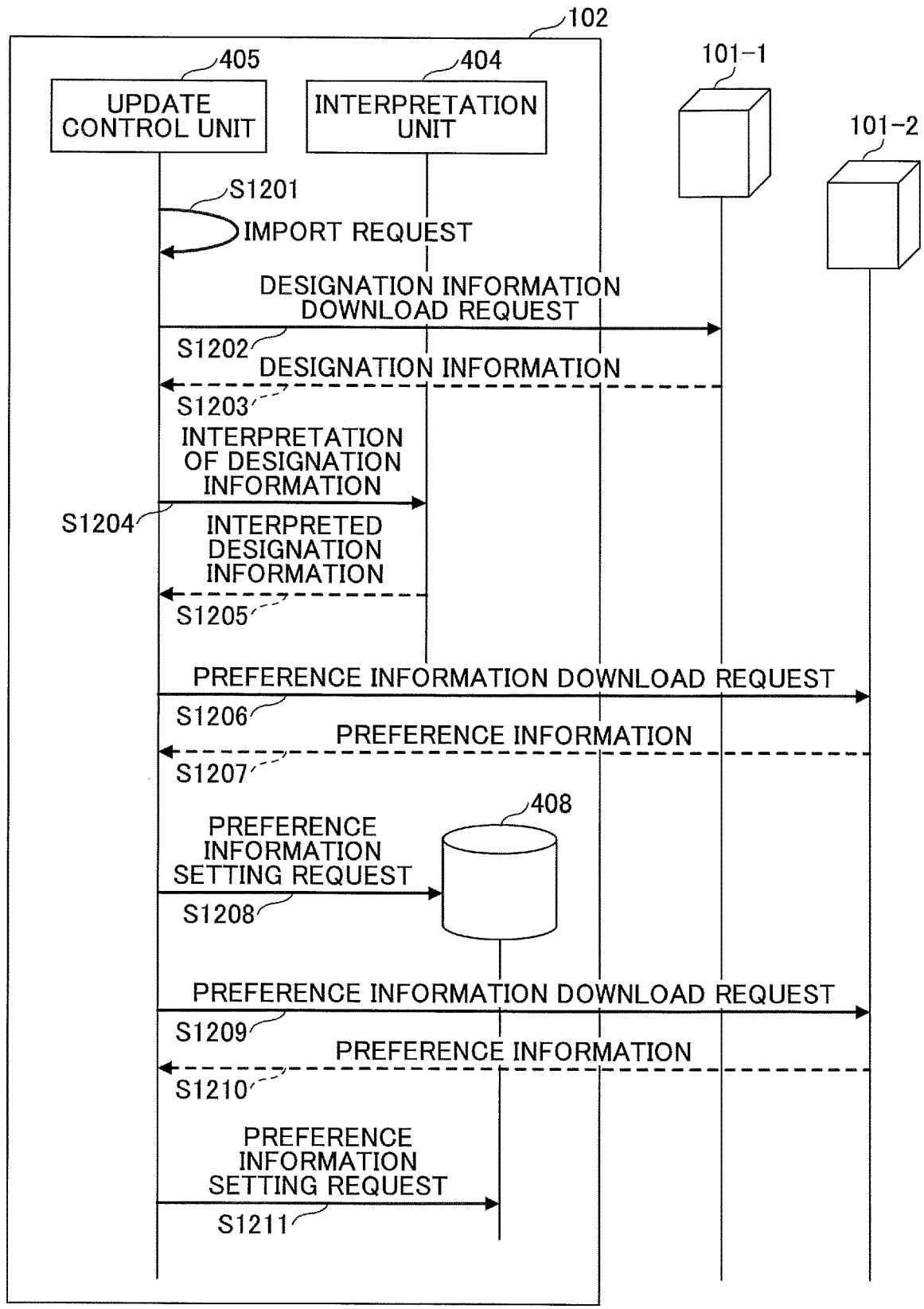
FIG. 12 is a sequence chart illustrating an example of processing for setting preference information according to the third embodiment.

FIG. 12 is a sequence chart illustrating an example of setting the preference information according to the third embodiment.

At step S1201, the update control unit 405 detects an import request based on the predetermined condition, e.g. an operation on the operation unit 401 or the like.

At step S1202, in the case where it is determined that there is an import request, the designation information acquisition unit 409 of the update control unit 405 sends a designation information download request to a predetermined server apparatus 101-1 via the communication control unit 407. Meanwhile, the image forming apparatus 102 stores information (e.g. URL information or the like) of the predetermined server apparatus 101-1, to which the designation information download request is sent, in the setting information 411 or the like in advance, for example.

At step S1203, the server apparatus 101-1, upon receiving the designation information download request from the image forming apparatus 102, reads out the designation information 705 stored in the storage unit 704 and sends it to the image forming apparatus 102 which is the request source.

At step S1204, the update control unit 405 requires the interpretation unit 404 to interpret the designation information received from the server apparatus 101-1.

At step S1205, the interpretation unit 404 performs the required interpretation of the designation information, and sends the interpreted designation information to the update control unit 405. Meanwhile, in the present embodiment, an arrangement place (acquisition origin) of the preference information included in the designation information is assumed to be the server apparatus 101-2, and the designation information 705 is assumed to include plural (e.g. two kinds of) pieces of preference information.

At step S1206, the setting information acquisition unit 410 of the update control unit 405 sends a preference information download request for requiring first preference information to the server apparatus 101-2, which is the acquisition origin of the preference information, included in the interpreted designation information.

At step S1207, the server apparatus 101-2, upon receiving the preference information download request, reads out the first preference information 706-1 in response to the preference information download request and sends it to the image forming apparatus 102, which is the request source.

At step S1208, the update control unit 405 requires the setting unit 406 to set the first preference information received from the server apparatus 101-2. Meanwhile, at this time, by the setting unit 406 transmitting a class of the first preference information (a category 504, a type 505 or the like in FIG. 5) to the setting unit 406, the setting unit 406 can perform setting according to the class of the first preference information.

At step S1209, the setting information acquisition unit 410 of the update control unit 405 sends a preference information download request for requiring second preference information to the server apparatus 101-2, which is the acquisition origin of the preference information, included in the interpreted designation information.

At step S1210, the server apparatus 101-2, upon receiving the preference information download request, reads out the second preference information 706-2 in response to the preference information download request and sends it to the image forming apparatus 102, which is the request source.

At step S1211, the update control unit 405 requires the setting unit 406 to set the second preference information received from the server apparatus 101-2. Meanwhile, at this time, by the setting unit 406 transmitting a class of the second preference information to the setting unit 406, the setting unit 406 can perform setting according to the class of the second preference information.

In this way, according to the third embodiment, since the designation information includes information indicating a class (category, type or the like) of each of the plural pieces of preference information, the image forming apparatus 102 can set plural classes of preference information in setting device information by using the pull-type method.

Figure 13:
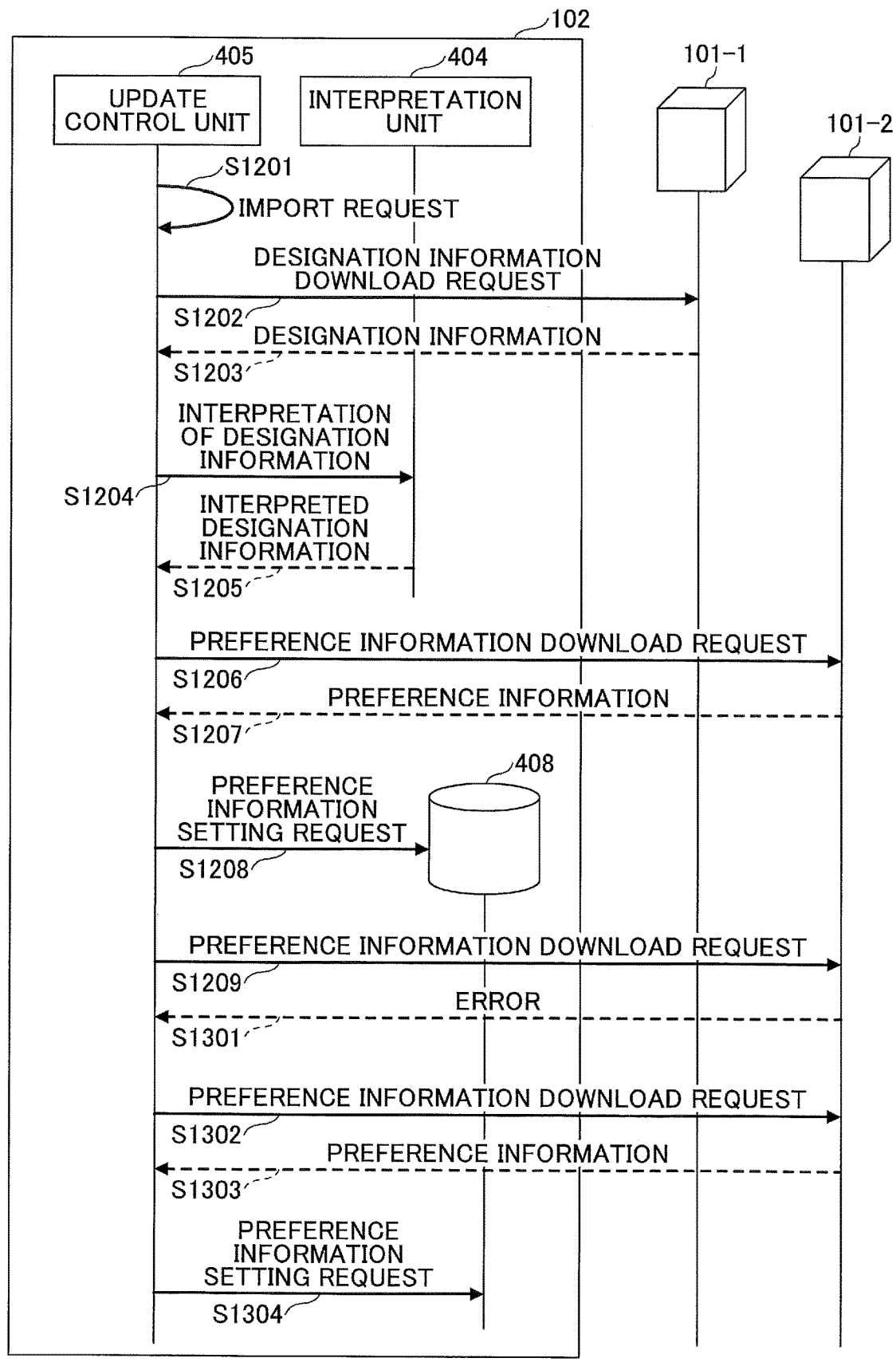
FIG. 13 is a sequence chart illustrating an example of processing in the case where the preference information cannot be acquired according to the third embodiment.

FIG. 13 is a sequence chart illustrating an example of processing in the case where the preference information cannot be acquired according to the third embodiment. Meanwhile, since processes at steps S1201 to S1208 are the same as those in FIG. 12, differences between the processes in FIG. 13 and those in FIG. 12 will be explained in the following.

At step S1301, the server apparatus 101-2, upon receiving the preference information download request, reads out the second preference information in response to the preference information download request. However, in the case that the second preference information cannot be acquired due to some sort of error such that, for example, the second preference information does not exist or is broken, the server apparatus 101-2 gives notice of the error to the image forming apparatus 102 which is the request source.

At step S1302, upon receiving the notice of the error from the server apparatus 101-2, next preference information is acquired without performing setting of the second preference information that cannot be acquired. That is, the setting information acquisition unit 410 of the update control unit 405 sends a preference information download request for requiring third preference information to the server apparatus 101-2, which is the acquisition origin of the preference information, included in the interpreted designation information.

At step S1303, the server apparatus 101-2, upon receiving the preference information download request, reads out the third preference information in response to the preference information download request, and sends it to the image forming apparatus 102, which is the request source.

At step S1304, the update control unit 405 requires the setting unit 406 to set the third preference information received from the server apparatus 101-2. The setting unit 406 reflects the required third preference information to the setting information 411 stored in the storage unit 408.

In this way, in the case where there is preference information that cannot be acquired among plural pieces of preference information, the image forming apparatus 102 can perform setting for preference information that can be acquired without stopping the update process.

[Other Embodiment]

Needless to say, the above-described embodiments are only examples, and various variations and modifications of system configuration may be made without departing from the scope of the present invention according to an application or a purpose. For example, the third embodiment shown in FIG. 11 has been explained with the server apparatus 101-2 including the plural pieces of preference information 706-1, 706-2 and the like. However, the plural pieces of preference information 706-1, 706-2 and the like may be arranged dispersedly in server apparatuses which are different from each other, for example.

Moreover, the image forming apparatus 102 may include the respective functions of the server apparatus 101. Furthermore, the respective functions of the server apparatus 101 may be provided by a cloud service or the like, for example.

<Summary>

As described above, an electronic device according to the present embodiment (image forming apparatus 102) operates based on setting information 411 stored in a storage unit 408. Moreover, the electronic device includes a designation information acquisition unit 409 for acquiring designation information 705 that includes information of an acquisition origin of common setting information (preference information 706) to be applied to plural electronic devices from a predetermined information processing apparatus (server apparatus 101) that is connected via a network 103. The electronic device according to the present embodiment further includes a setting information acquisition unit 410 for acquiring the common setting information from the acquisition origin based on the acquired designation information 705, and a setting unit 406 for setting setting information 411 based on the acquired common setting information.

According to the above-described configuration, the electronic device according to the present embodiment can easily send the acquisition origin of the common setting information to the plural electronic devices (image forming apparatuses 102-1 to 102-3) in an information processing system 100 in which the common setting information is set in the plural electronic devices by using the pull-type method.

Moreover, the designation information 705 in the information processing system 100 preferably includes plural pieces of information of the acquisition origin (arrangement places 503) of the common setting information. Thus, for example, even when the common setting information is arranged at plural information processing apparatuses (server apparatus 101-1, 101-2 and the like), the electronic device can acquire the common setting information by using the pull-type method.

Moreover, the designation information 705 in the information processing system 100 preferably includes information indicating a class of the common setting information (category 504, type 505 or the like). Thus, the plural pieces of common setting information, categories of which are different from each other, can be set collectively in the plural electronic devices (image forming apparatuses 102-1 to 102-3 or the like) by using the pull-type setting method.

<Program>

Moreover, each program executed in an electronic device or in an information processing system supplied with the electronic device is, as one mode, a file having an installable form or an executable form, recorded in a recording medium readable by a computer, such as a CD-ROM (Compact disc read only memory), a flexible disk (FD), a CD-R (Compact disc recordable) or a DVD (Digital Versatile Disk), and provided. Moreover, the program may be configured so as to be stored on a computer connected with a network such as the Internet, and may be provided by being downloaded via the network. Moreover, respective programs may be provided by being stored preliminary in a ROM or the like.

The program executed in the electronic device or in the information processing system supplied with the electronic device is configured so that, as actual hardware, by the CPU (processor) reading out a control program from a storage medium and executing it, the respective function parts, as described above, are loaded in a main memory, and the respective function parts are managed in the main memory.

Meanwhile, the reference numerals in parentheses as described above merely indicate examples, and the reference numerals do not limit the scope of the present invention.

Further, the present invention is not limited to these embodiments, but various variations and modifications may be made without departing from the scope of the present invention.

The present application is a continuation of and claims priority under 35 U.S.C. §§ 120/121 to U.S. patent application Ser. No. 15/290,403, filed on Oct. 11, 2016, which is a continuation of and claims priority under 35 U.S.C. §§ 120/121 to U.S. patent application Ser. No. 14/611,340, filed on Feb. 2, 2015, which is based on and claims the benefit of priority of Japanese Priority Application No. 2014-047218 filed on Mar. 11, 2014, the entire contents of each of which are hereby incorporated by reference.

What is claimed is:

1. An electronic device comprising:
   memory storing computer-readable instructions; and
   one or more processors configured to execute the instructions such that the one or more processors are configured to,
      send, to a first destination that is designated by first address information stored in the memory, a request to download second address information,
      download data including the second address information,
      send, to a second destination that is designated by the second address information, a request to download setting information,
      download the setting information, and
      set settings of the electronic device according to the downloaded setting information,
   wherein the first destination is a first server and the second destination is a second server different from the first server.

2. The electronic device of claim 1, wherein the downloaded setting information includes a plurality of setting items.

3. The electronic device of claim 1, wherein the first address information includes a first URL and the second address information includes a second URL, the first URL being a URL of the first destination, the second URL being a URL of the second destination.

4. The electronic device of claim 1, wherein the first destination is a first information processing apparatus and the second destination is a second information processing apparatus different than the first information processing apparatus.

5. A method of operating an electronic device comprising:
   sending, from the electronic device to a first destination that is designated by first address information stored in memory of the electronic device, a request to download second address information;
   downloading, to the electronic device, data including the second address information;
   sending, from the electronic device to a second destination that is designated by the second address information, a request to download setting information;
   downloading, to the electronic device, the setting information; and
   setting settings of the electronic device according to the downloaded setting information,
   wherein the first destination is a first server and the second destination is a second server different from the first server.

6. The method of claim 5, wherein the downloaded setting information includes a plurality of setting items.

7. The method of claim 5, wherein the first address information includes a first URL and the second address information includes a second URL, the first URL being a URL of the first destination, the second URL being a URL of the second destination.

8. The method of claim 5, wherein the first destination is a first information processing apparatus and the second destination is a second information processing apparatus different than the first information processing apparatus.

9. A non-transitory computer-readable storage medium storing instructions that, when executed by a processor, cause the process to perform operations including:
- sending, from an electronic device to a first destination that is designated by first address information stored in memory of the electronic device, a request to download second address information;
- downloading, to the electronic device, data including the second address information;
- sending, from the electronic device to a second destination that is designated by the second address information, a request to download setting information;
- downloading, to the electronic device, the setting information; and
- setting settings of the electronic device according to the downloaded setting information,
- wherein the first destination is a first server and the second destination is a second server different from the firsts server.

* * * * *